United States Patent [19]

Wada et al.

[11] Patent Number: 4,535,382
[45] Date of Patent: Aug. 13, 1985

[54] OIL-IMPREGNATED CAPACITOR

[75] Inventors: Hidekazu Wada, Itami; Hironori Yoshino, Osaka; Kohei Shiota, Kyoto, all of Japan

[73] Assignee: Matsushita Electric Industrial Co., Ltd., Osaka, Japan

[21] Appl. No.: 589,546

[22] Filed: Mar. 14, 1984

[30] Foreign Application Priority Data

Mar. 14, 1983 [JP] Japan ................................ 58-41792
Mar. 14, 1983 [JP] Japan ................................ 58-41787
Apr. 19, 1983 [JP] Japan ................................ 58-69444
Apr. 19, 1983 [JP] Japan ................................ 58-69441
Jun. 20, 1983 [JP] Japan ................................ 58-111239

[51] Int. Cl.$^3$ .................................... H01G 4/22
[52] U.S. Cl. ..................... 361/319; 252/572
[58] Field of Search .............. 361/314, 315, 317, 318, 361/319, 323, 324; 252/570, 572

[56] References Cited

U.S. PATENT DOCUMENTS

| | | | |
|---|---|---|---|
| 2,995,688 | 8/1961 | Rosenberg | 361/323 |
| 3,170,986 | 2/1965 | MacFadyen et al. | 174/17 R |
| 3,242,401 | 3/1966 | Katchman | 361/318 |
| 3,754,173 | 8/1973 | Eustance | 361/319 |
| 4,429,345 | 1/1984 | Vincent | 361/315 |

Primary Examiner—Donald A. Griffin
Attorney, Agent, or Firm—Stevens, Davis, Miller & Mosher

[57] ABSTRACT

An oil-impregnated capacitor produced by infiltrating a liquid impregnant containing at least one organometallic compound, represented by organic silane compounds, having a hydrolyzable group represented by alkoxy groups and acyloxy group and an organic functional group represented by vinyl group, epoxy group, mercapto group, methacrylo group, chlorine atom and peroxide group. It shows good characteristics when used under high stress conditions, in particular, at a high temperature and a high voltage.

29 Claims, 4 Drawing Figures

OIL-IMPREGNATED CAPACITOR

BACKGROUND OF THE INVENTION

The present invention relates to an oil-impregnated capacitor containing a plastic film or paper as a dielectric film.

In oil-impregnated capacitors, it is a very important and valuable means for realizing a small and light oil-impregnated capacitor that to increase the voltage per unit thickness applied to a dielectric layer. However, even if the potential stress is merely designed, there is such a problem that the resulting oil-impregnated capacitor has an enlarged dissipation factor, though the degree of the enlargement varies a little depending on the kinds of its dielectric film or paper and dielectric liquid, so that the thermal deterioration and the thermal destruction of the oil-impregnated capacitor are accelerated, resulting in impossibility to put the oil-impregnated capacitor to practical use as a capacitor. In particular, this tendency is more marked in capacitors used at higher temperatures, and is a serious problem in rendering oil-impregnated capacitors used at high temperatures smaller and lighter.

In order to improve these severe subjects, it has heretofore been proposed to incorporate so-called scavenger materials or getter materials into a liquid impregnant, but the demand for design of a high potential stress is still strong and now the subjects cannot be improved yet by addition of conventional scavenger materials. These conventional scavengers are used for capturing various impurities present in an insulating oil and various decomposition products produced during performance to establish the long-term stability of the capacitors. That is to say, their objects are as follows. The liquid impregnant is decomposed by thermal and electric energies during the performance and undergoes additional reaction with the decomposition products produced in the decomposition to deteriorate the electric characteristics (insulating characteristics, dielectric characteristics, etc.) of the liquid impregnant, and therefore this trouble is prevented by adding the scavengers. Dielectric films, for example, polyolefin films are contaminated with slight amounts of a metal chloride and chlorine because the metal chloride is used as a catalyst in the production process of the films, and the contaminants get mixed in the liquid impregnant to bring about disadvantageous effects on the electric characteristics of the liquid impregnant, and therefore this trouble is prevented by adding the scavengers.

As to the scavenger materials, epoxide compounds which does not contain metallic atom within their molecular structures are known to be particularly useful. For example, it has been proposed in U.S. Pat. No. 3,242,401 (Katchman) to incorporate dipentene dioxide as a scavenger into a liquid impregnant comprising a chlorinated aromatic compound. In U.S. Pat. No. 3,754,173 (Eustance), it has been proposed in order to stabilize the capacitors to incorporate epoxides into a liquid aromatic ester, and to neutralize impurities such as chlorine compounds having got mixed with the liquid impregnant from a dielectric film and decomposition products during the performance.

However, the liquid impregnants containing scavenger materials prosess inferior dielectric characteristics, in particular, an enlarged dissipation factor. Therefore, for example, when an oil-impregnated capacitor is used under a higher voltage stress condition, the amounts of the impurities produced by the decomposition during the performance are increased, therefore, even if a large amount of a scavenger is incorporated in order to increase the probability of neutralization of large amounts of the decomposition impurites, there is caused, contrary to the purpose, enlargement of dissipation factor and reduction of insulating resistance of the resulting oil-impregnated capacitor, so that the long-term stability of the capacitor is lowered, resulting in impossibility to design a high potential stress. Particularly when the oil-impregnated capacitor is used at a high temperature and at a higher voltage stress, the enlargement of the initial dissipation factor results in increase of the quantity of heat generated by the oil-impregnated capacitor, great case of thermal breakdown and reduction of the service life of the oil-impregnated capacitor.

Accordingly, in the case of oil-impregnated capacitors containing a stabilized liquid impregnant prepared by incorporating conventional scavenger or getter materials represented by epoxide compounds, the design of rated voltage (i.e. voltage stress) and temperature is limited, and it has been very difficult to obtain an oil-impregnated capacitor which can be used under higher potential and thermal stresses.

In short, the dissipation factor of the oil-impregnated capacitor used under a higher voltage stress condition becomes larger as compared with that of the capacitor used under a low voltage stress condition, so that much generation of heat accelerates thermal breakdown, and at last the capacitor is led to short service life, though the degree of these troubles vary depending on the kind of the liquid impregnant. There have been heretofore been used stabilized impregnants improved in the above-mentioned problems by neutralizing impurities present in the liquid impregnant and decomposition products produced during performance by adding scavenger or getter materials represented by epoxide compounds, but they have been insufficient for use under higher stress conditions, in particular, at a high temperature and under a high voltage stress. That is to say, this is because under conditions of a high temperature and a high voltage stress, the amounts of the decomposition products produced during performance are increased, and increasing the amount of the scavenger material in order to neutralize large amounts of these impurities causes an enlargement of the initial dissipation factor and a lowering of the insulation resistance, so that the resulting capacitor has only a shorter service life. Further, as to the impurities which deteriorate the characteristics of oil-impregnated capacitors and/or shorter the life of the capacitors, there exist not only organic impurities but also inorganic impurities, metal ions and the like. In particular, oil-impregnated capacitors having vapor-deposited metal layers as a pair of electrodes are advantageous in that the weak portion of its dielectric layer is cleaned by self-heating action, but on the other side, a large amount of metal ions are produced. For removing or neutralizing these impurities, conventional scavenger materials such as epoxide compounds and the like have been insufficient.

Here, it has been found that incorporation of a liquid impregnant with organometallic compounds, for example, organosilane compounds or organotitanate compounds greatly improves the dissipation factor of an oil-impregnated capacitor having a plastic film and/or paper as a dielectric film, and makes it possible to prolong the service life of the oil-pregnated capacitor under heretofore unusable higher stress conditions, in particular, under the circumstances of a high temperature and a high voltage.

SUMMARY OF THE INVENTION

Accordingly, an object of the present invention is to provide an oil-impregnated capacitor better in electric characteristics and high reliability in performance under high stress conditions by using a newly-invented stabilized liquid impregnant containing at least one organometallic compound having a hydrolyzable group and an organic functional group.

Another object of the present invention is to provide a small and light weight oil-impregnated capacitor capable of withstanding a higher voltage stress by reducing the thickness of dielectric films.

Still another object of the present invention is achieved by the oil-impregnated capacitors shown in the accompanying claims. That is to say, the oil-impregnated capacitor of the present invention has a dielectric film comprising a plastic film and/or paper and a pair of electrodes, and is produced by impregnating them with a liquid impregnant containing at least one organometallic compound having both a hydrolyzable group and an organic functional group.

The oil-impregnated capacitor of the present invention has a dielectric film comprising a plastic film and/or paper and a pair of electrodes, and is produced by impregnating them with a liquid impregnant containing at least one organosilane compound having the general formula:

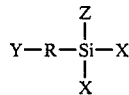

wherein X is a hydrolyzable group linked to the Si atom, typical examples of X being alkoxy groups, acyloxy groups (in particular, acetoxy group) and the like; Z is an alkyl group, an alkoxy group or an acyloxy group (in particular, an acetoxy group); and Y is one of various organic functional group, typical examples of Y being organic functional groups containing a vinyl group, an epoxy group, a mercapto group, a methacrylo group, a chlorin atom, a peroxide group or the like, and is linked to the Si atom directly or through the alkyl group R.

In one example, the aforesaid organic silane compound can be represented by the formula:

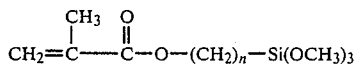

wherein n is 1 to 6.

In another example, the aforesaid organic silane compound can be represented by the formula:

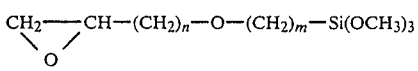

wherein n is 1 to 6 and m is 1 to 6.

In further another example, an insulating oil constituting the oil-impregnated capacitor is a non-halogenated fluid. As to the said non-halogenated fluid, at least one member selected from the group consisting of organic acid ester oils, hydrocarbon oils, vegetable oils and ether oils may be used.

As to the aforesaid insulating oil, mixed oils of organic phosphate liquids may also be used.

As to the aforesaid phosphate liquids, tricresyl phosphate, trixylenyl phosphate and the like may also be used.

The aforesaid insulating oil may contain epoxide compounds which have non-metallic atoms within their molecular structures.

As to the aforesaid electrodes, vapor deposited metal layers may be used.

As to the aforesaid electrodes, zinc metallized paper or plastic film may be used.

The hydrolyzable group contained in the organometallic compound in the oil-impregnated capacitor of this invention is represented by alkoxy groups and acyloxy groups (in particular, acetoxy group), and the organic functional group is represented by vinyl group, epoxy group, mercapto group, methacrylo group, chloro group and peroxide group. The oil-impregnated capacitor of the present invention in which the liquid impregnant contains said organometallic compound has characteristics different from those of oil-impregnated capacitors produced by using conventional scavenger materials represented by epoxide compounds.

That is to say, its marked characteristics which have heretofore been unobtainable in the conventional impregnant are capture of impurities in the liquid impregnant by addition of the aforesaid organometallic compound and formation of a thin film of the organometallic compound on the electrode surfaces, and these are quite new effects which have been made obtainable by addition of the organometallic compound wherein a hydrolyzable group is linked to a metal atom. The formation of the thin film becomes easy at a high temperature and a high voltage. The thin film of the organometallic compound formed on the electrode surfaces has a function of suppressing production of metal ions from the electrodes and reducing the effects of impurity in the liquid impregnant, and a function of relaxing the concentration of the electric field due to the unevenness of the electrode surfaces.

Further, as another heretofore newly-realized characteristics, said thin film has a function of linking organic impurities existing between the electrodes or decomposition products produced during the performance to the electrode surfaces through the aforesaid organometallic compound, suppresses transportation of the organic impurities between the electrodes due to applying AC voltage, and improves the dissipation factor of the oil-impregnated capacitor.

Further, inorganic impurities and metal ions also can be neutralized simultaneously and at the same time the organic impurities existing in the liquid impregnant and the decomposition products produced during the performance can also be neutralized by the organometallic compounds.

Owing to these characteristics, the oil-impregnated capacitor of the present invention produced by using an improved liquid impregnant containing at least one organometallic compound having both a hydrolyzable group and an organic functional group can have a very good (particularly at a high temperature and a high voltage) dissipation factor which cannot be possessed by oil-impregnated capacitors produced by using a liquid impregnant containing conventional scavenger materials, and can be used under high voltage stress conditions.

DESCRIPTION OF THE PREFERRED EMBODIMENTS

Figure 1:
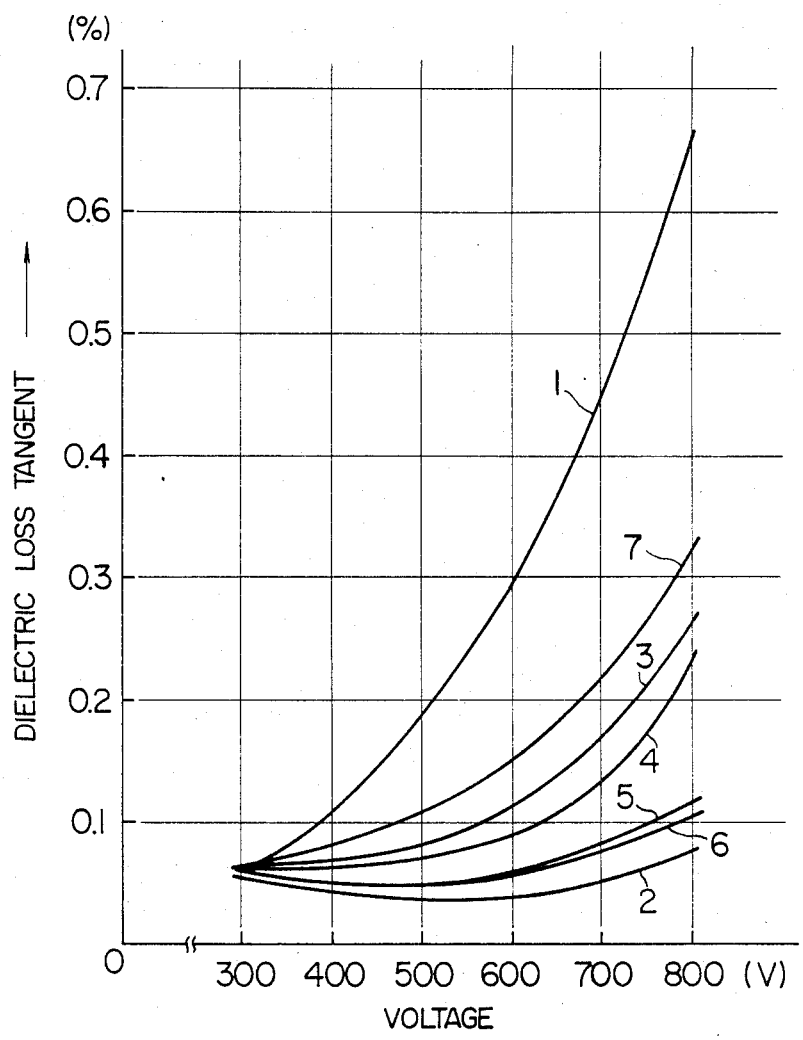
FIG. 1 shows the voltage characteristics of the capacitor dissipation factors at a temperature of 100° C. of oil-impregnated capacitors in one example of the present invention and a conventional oil-impregnated capacitor.

The oil-impregnated capacitor in the present invention has a dielectric film comprising a plastic film, paper or a mixture thereof and is produced by infiltrating a liquid impregnant containing at least one organometallic compound having both a hydrolyzable group and an organic functional group.

Typical examples of the organometallic compound having both a hydrolyzable group and a organic functional group are organosilane compounds or organotitanate compounds.

In particular, the organosilane compounds have heretofore been used for purposes such as adhesives for adhesion between an inorganic material and an organic material, have already industrially been produced.

Organosilane compounds preferable as the organometallic compound of the present invention can be selected from one or more compounds having the general formula:

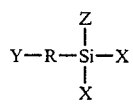

wherein X is a hydrolyzable group linked to the Si atom, typical examples of X being alkoxy groups, acyloxy groups (in particular, acetoxy group) and the like; Z is an alkyl group, an alkoxy group or an acyloxy group (in particular, an acetoxy group); and Y is one of various organic functional groups, typical examples of Y being organic functional groups containing a vinyl group, an epoxy group, a mercapto group, a methacrylo group, a chlorine atom, a peroxide group or the like, and is linked to the Si atom directly or through the alkyl group R.

Specific examples of the organosilane compounds include vinyltrimethoxysilane, vinyltriethoxysilane, vinyltris($\beta$-methoxyethoxy)silane, $\gamma$-methacryloxypropyltrimethoxysilane, $\gamma$-methacryloxypropylmethyldimethoxysilane, $\gamma$-glycidoxypropyltrimethoxysilane, $\gamma$-glycidoxypropylmethyldimethoxysilane, $\gamma$-chloropropyltrimethoxysilane, $\gamma$-chloropropylmethyldimethoxysilane, $\gamma$-chloropropylmethyldiethoxysilane, $\gamma$-mercaptopropyltrimethoxysilane and the like.

Among them, preferable organosilane compounds are those having the general formula:

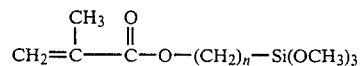

wherein n is 1 to 6 which are represented by $\gamma$-methacryloxypropyltrimethoxysilane, and those having the general formula:

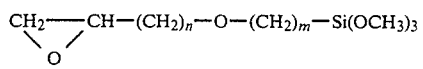

wherein n is 1 to 6 and m is 1 to 6 which are represented by $\gamma$-glycidoxypropyltrimethoxysilane.

Although the amount of the aforesaid organosilane compound incorporated into the liquid impregnant varies depending on the use, the service temperature, the rating or the like of an oil-impregnated capacitor to be produced, it is generally preferable to incorporate at least one of the above-mentioned organosilane compounds in an amount of 0.02 to 10 parts by weight, preferably, as shown in Table 2 hereinafter explained, 0.1 to 10 parts by weight per 100 parts by weight of a liquid used as the liquid impregnant. This is because the incorporation in an amount of 0.1 to 10 parts by weight has effects more marked than those of the incorporation in an amount of 0.02 to 0.1 part by weight and gives an oil-impregnated capacitor which can be used under higher stress conditions. Although the effects of the present invention can sufficiently be obtained even when the amount incorporated is 10 parts by weight or less, it is desired to be as small as possible when economy is taken into consideration.

As to the liquid used in the impregnant in the oil-impregnated capacitor of this invention, there may be used non-halogenated liquids, for example, ester oils such as phthalic acid esters, fatty acid esters, maleic acid esters, fumaric acid esters, organic phosphoric acid esters and the like; hydrocarbon oils such as arylalkanes such as alkylbenzenes, alkylnaphthalenes, alkyldiphenylethanes, and the like, polybutenes, liquid paraffins and mineral oils, vegetable oils, ether oils, etc. and mixed liquids thereof. Liquids which are particularly preferred and bring about marked effects are dioctyl phthalate (DOP) and di(2-ethylhexyl)phthalate which are aromatic esters; alkyldiphenylethane, alkylbenzenes and alkylnaphthalenes which are hydrocarbon oils; belonging to arylalkanes; and alkyl diphenyl ethers which are ether oils.

These liquids may contain conventional scavenger materials. The lqiuids preferably contain epoxide compounds as scavenger materials.

Further, there may be used mixtures of the above-mentioned liquids and organic phosphoric acid esters such as tricresyl phosphate.

The structure of the capacitor element to be impregnated with a liquid impregnant in this invention has a dielectric film comprising a plastic film, paper or a mixture thereof and a pair of electrodes.

As to specific examples, there are used, for example, capacitor elements having a structure given by using a polypropylene film, paper or a mixture thereof as a dielectric film, placing thereon a pair of metal foils, and rolling up the resulting assembly; capacitor elements having a structure given by using at least one polypropylene film or polycarbonate film as a dielectric film, placing thereon double vapor-deposited metallized paper as a pair of electrodes, winding up the resulting assembly, and then forming a metal-sprayed layer at the end of the resulting wound element; or capacitor elements having a structure given by winding up at least one polypropylene film, polycarbonate film or polyethylene terephthalate film one side or both sides of which have been metallized by vapor deposition, and then forming a metal-sprayed layer at the end of the resulting rolled element.

Preferable structures bringing about great effects are those having metallized paper or a metallized film having vapor deposited metal layers as a pair of electrodes. The effects of the present invention is marked particularly in structures having zinc-metallized paper or film.

The oil-impregnated capacitor of the present invention produced by infiltrating an improved liquid impregnant containing the above-mentioned organosilane compounds possesses marked characteristic which cannot be obtained by oil-impregnated capacitors produced by using a liquid impregnant containing conventional scavenger materials such as epoxide compounds. That is to say, in the oil-impregnated capacitor of the present invention containing the aforesaid organosilane compounds, a thin film of the organosilane compound is formed on each electrode surface, which is hence covered with the thin film. Owing to the films of the organosilane compound formed on the electrode surfaces, metal ions generated from the electrodes into the liquid impregnant are greatly reduced, and the influence of impurities in the liquid impregnant on the capacitor dissipation factor is reduced, so that the oil-impregnated capacitor has a less dissipation factor. Further, the films have a function of relaxing the electric field and suppress local destruction of liquid impregnant due to concentration of the electric field caused by the unevenness of the electrode surfaces under a high voltage stress. The films of the organosilane compound are more easily formed at a high temperature and a high voltage and hence are more effective when the oil-impregnated capacitor is used at a high temperature and a high voltage, as the dissipation factor is reduced with the formation of the films, so that the oil-impregnated capacitor is further improved. Although the thickness of the organosilane compound films formed on the electrode surfaces varies depending on the kind and amount of the organosilane compound incorporated, the service temperature, the applied voltage and the period applying the voltage, films of about tens Å to hundreds Å in thickness are formed.

Another heretofore unobtainable characteristic is as follows. The organic functional group of the aforesaid organosilane compound combines with organic impurities existing in the insulating oil between the electrodes, and since the aforesaid organosilane compound has a hydrolyzable group such as by alkoxy group and acyloxy group (in particular, acetoxy group), the hydrolyzable group is hydrolyzed, whereby a silanol is produced and undergoes chemical bonding with —OH on the electrode surfaces. Therefore, the organosilane compound has an effect of binding the organic impurities joined with the functional group to the electrode surfaces, which is very different from the effects of conventional scavenger materials which merely combine with or neutralize the organic impurities. In other words, the aforesaid improved liquid impregnant improves the capacitor dissipation factor in application of an alternating voltage by binding the organic impurities to the electrode surfaces through the organosilane compound.

Further, inorganic impurities and metal ions existing in the liquid impregnant are also more easily neutralized by the action of the hydrolyzable group as compared with the case of conventional scavenger materials. Particularly in oil-impregnated capacitors having vapor-deposited metal layers as electrodes, a large amount of metal ions are produced by self-healing. This production is suppressed by the aforesaid organosilane compound films, the hydrolyzable group acts also on metal ions appearing in the liquid impregnant, so that an oil-impregnated capacitor having a more stable dissipation factor is obtained.

A more specific explanation is given below. As to the voltage characteristic of the capacitor dissipation factor at a temperature of 80° to 100° C., when a high voltage is applied, the capacitor dissipation factor of conventional oil-impregnated capacitors is rapidly enlarged, while that of the oil-impregnated capacitor of the present invention remains very small. In the change of capacitor dissipation factor with the lapse of time in the case where a voltage 1.4 to 1.8 times as high as the rated voltage is applied at an ambient temperature of 70° to 100° C., the dissipation factor of the oil-impregnated capacitor of this invention decreases very rapidly as compared with that of conventional ones.

In the case of adding the conventional scavenger, even if the inclination decreasing the dissipation factor may be observed, the phenomenon causes very slowly and the degree of that is very little. Because the difference of the effects is caused by the difference of the stabilizing mechanisms, i.e., in the case of the present invention, the impurities are reacted with organometallic compound and they are fixed on the surface of the electrode, contrary in the case of the conventional scavenger with which the impurities are merely reacted but they do not fixed anywhere.

Further, the oil-impregnated capacitor of the present invention has a very high voltage resistance at an ambient temperature of 70° to 100° C. For example, in a step-up withstand voltage test in which applied voltage for the oil-impregnated capacitor is raised by a definite voltage at every definite interval, the step-up withstand voltage of the oil-impregnated capacitor of the present invention is much higher than that of conventional oil-impregnated capacitors when a voltage at which each oil-impregnated capacitor was broken down was defined as the step-up withstand voltage. When the relationship between life time and the residual percentage of the unbroken oil-impregnated capacitors is tested in a high-voltage life test on the oil-impregnated capacitors, the oil-impregnated capacitor of this invention shows a residual percentage higher than that of conventional oil-impregnated capacitors and shows very good results as a highly withstand-voltage capacitor.

Next, examples of the present invention are explained below. However, the following examples are not limitating the scope of the present invention but merely illustrating the present invention.

EXAMPLE 1

A capacitor element having a structure given by using double zinc-vapor-deposited paper as a pair of electrodes and a pair of polypropylene film of 5 μm in thickness as a dielectric films, placing them one upon the other, winding up the resulting assembly, and then forming a metal-sprayed layer at the both ends of the resulting wound element, was impregnated with a liquid impregnant prepared by mixing an organosilane compound with di(2-ethylhexyl)phthalate (hereinafter referred to as DOP), an aromatic ester, which contained 1% of a conventional scavenger material. Oil-impregnated capacitors having a capacitance of 10 μF were thus prepared by using each of several organosilane compounds. The amount of the organosilane compound incorporated was 0.5 part by weight per 100 parts by weight of the liquid impregnant.

The voltage characteristic results of the capacitor dissipation factors at 100° C. of the oil-impregnated capacitors are shown in FIG. 1. In FIG. 1, numerals (1) to (7) show the oil-impregnated capacitors in the case where the organosilane compound incorporated was each of (1) no organosilane compound, (2) γ-methacryloxypropyltrimethoxysilane, (3) γ-glycidoxypropyltrimethoxysilane, (4) vinyltriethoxysilane, (5) γ-chloropropyltrimethoxysilane, (6) γ-mercaptopropyltrimethoxysilane and (7) vinyltris(β-methoxyethoxy)silane.

The results as indicated in FIG. 1 show that the dissipation factor of the oil-impregnated capacitor produced by using a conventional stabilized liquid impregnant containing the epoxide scavenger material and no organosilane compound is rapidly enlarged, while the dissipation factors of all the oil-impregnated capacitors (2), (3), (4), (5), (6) and (7) of the present invention produced by incorporating each organosilane compound are much smaller than that of the conventional oil-impregnated capacitor.

Further, the results of a step-up withstand voltage test at 80° C. on these oil-impregnated capacitors are shown in Table 1. In the step-up voltage resistance test, a voltage of 400 V was first applied to each oil-impregnated capacitor for 1 hour, and then the applied voltage was raised by 50 V at every 1 hour interval, and a voltage at which the oil-impregnated capacitor was broken down was defined as step-up voltage resistance. The data as indicated in Table 1 show that the oil-impregnated capacitors of this invention possessed improved withstand voltage owing to the excellent effect of the organosilane compound on the dissipation factor as compared with the oil-impregnated capacitor produced by using a liquid impregnant containing 1% of the conventional epoxide scavenger material and no organosilane compound. In the case of capacitors impregnated with conventional impregnant incorporating no organosilane, the step-up withstand voltage was not remarkably increases, even if the amount of the epoxide scanvenger was varied in the range from 0.03% to 3% by weight.

Although these results were obtained when 3,4-epoxycyclohexylmethyl 3,4-epoxycyclohexanecarboxylate was used as the epoxide scavenger material, marked effects of incorporation of the organosilane compound was similarly obtained also when there was used, as the epoxide scavenger material, phenoxy oxide, glycidyl allyl ether, benzylethylene oxide, styrene oxide, di(2-ethylhexyl)-4,5-epoxytetrahydrophthalate, 1-epoxyethyl-3,4-epoxycyclohexane or vinylcyclohexanedioxide which were shown, for example, in U.S. Pat. Nos. 3,242,401, 3,170,986 and 3,754,173.

TABLE 1

| Sample No. | Organosilane compound (% by weight) | Set-up voltage resistance (V) |
|---|---|---|
| 1 | No organosilane compound | 500 |
| 2 | γ-Methacryloxypropyltrimethoxysilane (0.5) | 900 |
| 3 | γ-Glycidoxypropyltrimethoxysilane (0.5) | 700 |
| 4 | Vinyltriethoxysilane (0.5) | 700 |
| 5 | γ-Chloropropyltrimethoxysilane (0.5) | 800 |
| 6 | γ-Mercaptopropyltrimethoxysilane (0.5) | 800 |
| 7 | Vinyltris(β-methoxyethoxy)silane (0.5) | 700 |

EXAMPLE 2

A capacitor element having the same structure as in Example 1, except that a polypropylene film of 6 μm in thickness was used as a dielectric film, was impregnated with an improved liquid impregnant prepared by mixing an organosilane compound with an alkylbenzene. Oil-impregnated capacitors having a capacitance of 30 μF were thus produced. As the organosilane compound, γ-methacryloxypropyltrimethoxysilane was used, and it was incorporated in an amount of each of 0.02, 0.1, 0.5, 1, 5, 10 and 15 parts by weight per 100 parts by weight of the liquid impregnant.

A step-up withstand voltage test at 80° C. of all the oil-impregnated capacitors was carried out by the same method as described in Example 1. The results are shown in Table 2.

The data in Table 2 show that the organosilane compound contained in the oil-impregnated capacitors of this invention has an effect of improving the step-up withstand voltage when its amount is 0.02 to 10 parts by weight per 100 parts by weight of the liquid impregnant, and it can be understood that the effect is greater when the amount is 0.1 to 10 parts by weight than when it is 0.02 to 0.1 part by weight.

TABLE 2

| Sample No. | Organosilane compound (% by weight) | Withstand voltage Step-up (V) |
|---|---|---|
| 8 | No organosilane compound | 800 |
| 9 | γ-Methacryloxypropyltrimethoxysilane (0.02) | 850 |
| 10 | γ-Methacryloxypropyltrimethoxysilane (0.1) | 950 |
| 11 | γ-Methacryloxypropyltrimethoxysilane (0.5) | 1050 |
| 12 | γ-Methacryloxypropyltrimethoxysilane (1) | 1100 |
| 13 | γ-Methacryloxypropyltrimethoxysilane (5) | 1150 |
| 14 | γ-Methacryloxypropyltrimethoxysilane (10) | 1000 |
| 15 | γ-Methacryloxypropyltrimethoxysilane (15) | 900 |

EXAMPLE 3

There were produced oil-impregnaged capacitors of the present invention in which a capacitor element having the same structure as in Example 1 was impregnated with a liquid impregnant prepared by adding an organosilane compound with each of DOP, an alkyldiphenylethane, an alkylnaphthalene, an alkylbenzene and an alkyldiphenylether as a liquid used in the impregnant, and a conventional oil-impregnated capacitor containing no organosilane compound. The former capacitors were compared with the latter capacitor. As to the organosilane compound, γ-methacryloxypropyltrimethoxysilane and γ-glycidoxypropyltrimethoxysilane were individually used.

A step-up withstand voltage resistance test at 80° C. on all the oil-impregnated capacitors was carried out by the same method as described in Example 1. The results are shown in Table 3.

The data in Table 3 show that the effects of this invention are brought about in various liquids including DOP which is an organic acid ester, the alkyldiphenylethane, the alkylnaphthalene and the alkylbenzene, which are hydrocarbon oils, and alkyldiphenylether, and it can be understood that new effects can be obtained in various non-halogenated liquids including esters and hydrocarbon oils.

TABLE 3

| Sample No. | Liquid | Organosilane compound (% by weight) | Withstand voltage Step-up (V) |
| --- | --- | --- | --- |
| 16 | DOP | No organosilane compound | 500 |
| | | γ-Methacryloxypropyltrimethoxysilane (0.5) | 900 |
| | | γ-Glycidoxypropyltrimethoxysilane (0.5) | 700 |
| 17 | Alkyldiphenylethane | No organosilane compound | 600 |
| | | γ-Methacryloxypropyltrimethoxysilane (1) | 750 |
| | | γ-Glycidoxypropyltrimethoxysilane (1) | 700 |
| 18 | Alkylnaphthalene | No organosilane compound | 550 |
| | | γ-Methacryloxypropyltrimethoxysilane (1) | 750 |
| 19 | Alkylbenzene | No organosilane compound | 750 |
| | | γ-Methacryloxypropyltrimethoxysilane (0.5) | 1000 |
| 20 | Alkyldiphenylether | No organosilane compound | 600 |
| | | γ-Glycidoxypropyltrimethoxysilane (1%) | 750 |

EXAMPLE 4

An oval-shaped capacitor element having the same structure as in Example 1, except that a polypropylene film of 8 μm in thickness was used as a dielectric film, was impregnated with a liquid impregnant prepared by mixing an organosilane compound with a mixed oil of DOP and an alkyldiphenylethane which was an aromatic hydrocarbon. Oil-impregnated capacitors having a capacitance of 32 μF were thus produced. As the organosilane compound, γ-methacryloxypropyltrimethoxysilane, γ-glycidoxypropyltrimethoxysilane or vinyltris(β-methoxyethoxy)silane was used.

Figure 2:
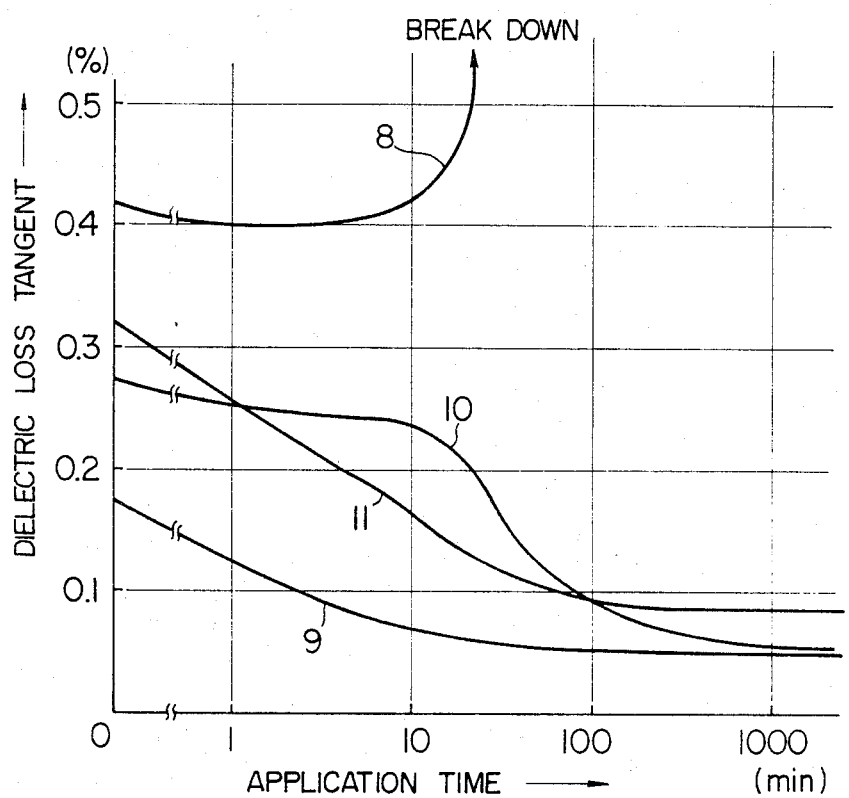
FIG. 2 shows the changes of the capacitor dissipation factors with the lapse of time at a temperature of 90° C. of oil-impregnated capacitors in one example of the present invention and a conventional oil-impregnated capacitor in the case of continuous application of a constant voltage.

There were measured the change of the capacitor dissipation factor with the lapse of time in the case where the voltage of 720 V was applied to each oil-impregnated capacitor at 90° C. The results are shown in FIG. 2. In FIG. 2, numeral (8) to (11) show the oil-impregnated capacitors in the case of (8) no organosilane compound, (9) γ-methacryloxypropyltrimethoxysilane (1% by weight), (10) γ-glycidoxypropyltrimethoxysilane (0.5% by weight) and (11) vinyltris(β-methoxyethoxy)silane (0.5% by weight), respectively.

The results as indicated in FIG. 2 show that in the case of the conventional oil-impregnated capacitor containing no organosilane, the dissipation factor becomes larger with the lapse of voltage application time, resulting in breakdown, while in the case of the oil-impregnated capacitors of this invention containing each organosilane compound, the dissipation factor becomes smaller with the lapse of voltage application time, so that breakdown is not caused.

In this case, no epoxide scavenger material was incorporated into the liquid impregnant, but even if an epoxide scavenger material was incorporated thereinto but no organosilane compound was incorporated thereinto, only a short life can be obtained. Specifically, even when 3,4-epoxycyclohexylmethyl, 3,4-epoxycyclohexanecarboxylate was used as the epoxide compound and incorporated in such an amount that the amount of the epoxy group incorporated corresponded to the amount of epoxy group in the case of the incorporation of γ-glycidoxypropyltrimethoxysilane of (10) having the epoxy group or in larger amount, the resulting oil-impregnated capacitors showed the same tendency is that of (8), were all broken down within 100 minutes, and were obviously quite different from the oil-impregnated capacitor (10) of the present invention.

Further, it was observed by X-ray photoelectronic spectrometry that an organosilane compound film of several tens Å in thickness had been formed on the electrode surfaces after applying voltage to the oil-impregnated capacitors (9), (10) and (11) of the present invention produced by incorporating each organosilane compound.

EXAMPLE 5

An oval-shaped capacitor element having a structure given by using double aluminum-vapor-deposited paper which is metallized on the both surface with aluminum as a pair of electrodes and a pair of polypropylene film of 8 μm in thickness as a dielectric film, placing one upon the other, winding up the resulting assembly, and forming a metal-sprayed layer at the end of the resulting wound element, was impregnated with a liquid impregnant prepared by mixing γ-glycidoxypropyltrimethoxysilane (0.5% by weight) with DOP containing an epoxide scavenger material. Oil-impregnated capacitor having a capacitance of 8.5 μF was thus produced. For comparison, there was produced a conventional oil-impregnated capacitor containing no organosilane compound which had the same structure as described above, except that a polypropylene film of 8.8 μm in thickness was used, and the aforesaid oil-impregnated capacitor were subjected to a step-up withstand voltage test at 100° C. and compared with each other. In the step-up withstand voltage test, a voltage of 800 V was first applied for 24 hours, and then the applied voltage was raised by 50 V at every 24 hours interval, and a voltage at which each oil-impregnated capacitor was broken down was defined as step-up withstand voltage. The results are shown in Table 4. The data in Table 4 show that in the case of the oil-impregnated capacitor of this invention, it is possible to thin the dielectric film and therefore to make the capacitor small and light through a high voltage stress design.

TABLE 4

| Sample No. | Thickness | Organosilane compound (% by weight) | Withstand voltage step-up (V) |
| --- | --- | --- | --- |
| 21 | 8.8 μm | No organosilane compound | 1050 |
| 22 | 8 μm | γ-Glycidoxypropyltrimethoxy- | 1150 |

TABLE 4-continued

| Sample No. | Thickness | Organosilane compound (% by weight) | Withstand voltage step-up (V) |
|---|---|---|---|
| | | silane (0.5) | |

EXAMPLE 6

There were produced an oil-impregnated capacitors (A) in which an oval-shaped capacitor obtained by using a pair of aluminum foil electrodes and a pair of three polypropylene films of 15 μm in thickness and rolling up the resulting assembly, was impregnated with a liquid impregnant prepared by mixing γ-methacryloxypropyltrimethoxysilane (2% by wt.) with an alkylnaphthalene containing an epoxide scavenger material, an oil-impregnated capacitor (B) in which the same capacitor element as described above was impregnated with a liquid impregnant prepared by mixing γ-glycidoxypropyltrimethoxysilane (1% by wt.) with a dialkyl diphenyl ether belonging to ether oils which contained the epoxide scavenger material, and for comparison, many conventional oil-impregnated capacitors (C) containing no organosilane compound but containing the epoxide scavenger. They were subjected to a life test by applying a high voltage in an atmosphere having a temperature of 80° C.

Figure 3:
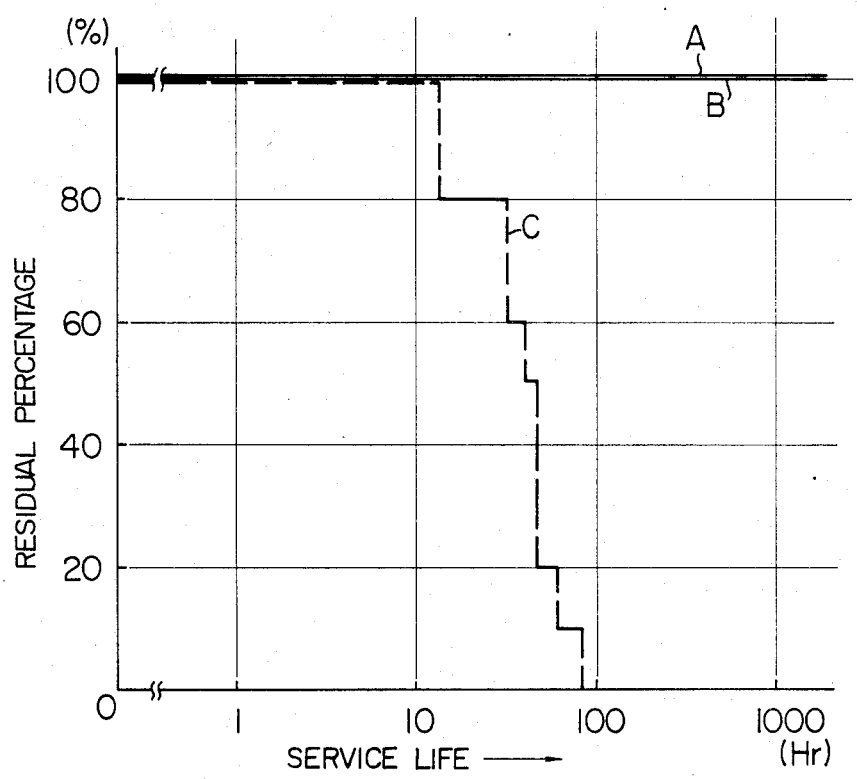
FIG. 3 shows the change of the residual percentage in a life test on oil-impregnated capacitors in one example of the present invention as comparing with a conventional oil-impregnated capacitor.

The results of the life test carried out by applying a voltage of 4,000 V are shown in FIG. 3 in terms of the residual percentage.

It can be seen from the results in FIG. 3 that the oil-impregnated capacitors (C) were all broken down within 100 hours, while the oil-impregnated capacitors (A) and (B) of this invention containing the respective organosilane compounds showed such a very high residual percentage as 100% even after 1,000 hours. In other words, the results show that the capacitors (A) and (B) are very good as highly withstand-voltage capacitors.

The same results as described above were obtained also when the dialkyl diphenyl ether of this Example was replaced by castor oil or sesame oil which are vegetable oils.

EXAMPLE 7

There were produced an oil-impregnated capacitors (D) in which an oval-shaped capacitor element obtained by using a pair of aluminum foil electrodes and a pair of three polypropylene films of 15 μm in thickness, and winding up the resulting assembly, was impregnated with a liquid impregnant prepared by mixing γ-methacryloxypropyltrimethoxysilane (3% by wt.) with a mixed oil of an alkyldiphenylethane and tricresyl phosphate, and for comparison, many conventional oil-impregnated capacitors (E) containing no organosilane compound but containing the epoxide scavenger. They were subjected to a life test by applying a high voltage in an atmosphere having a temperature of 80° C.

Figure 4:
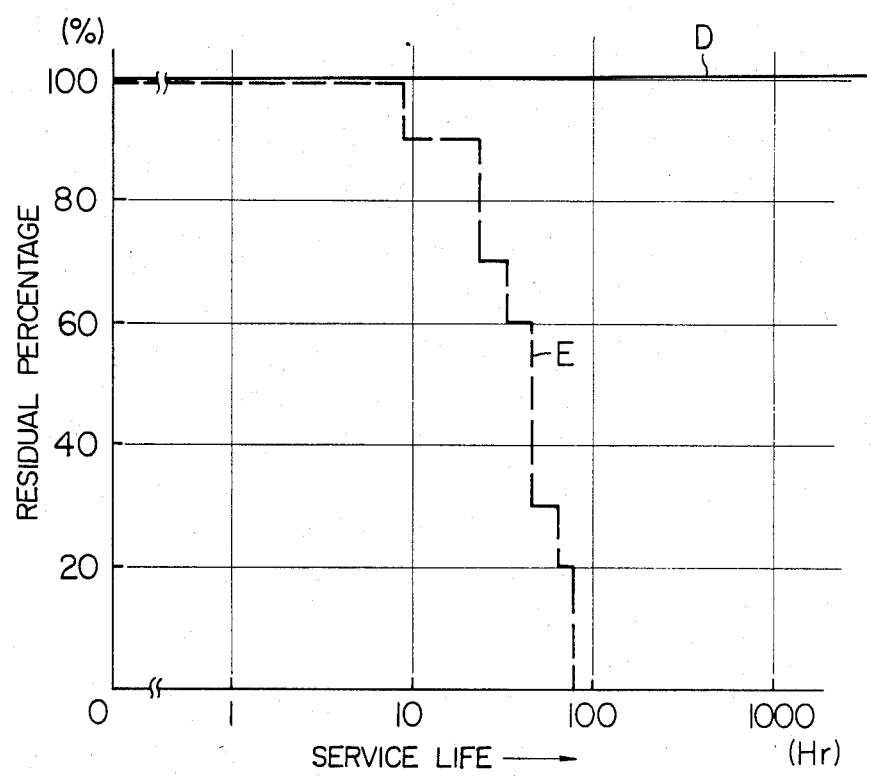
FIG. 4 shows the change of the residual percentage in a life test on an oil-impregnated capacitor in another example of the present invention produced by using an impregnant containing a phosphate and a conventional oil-impregnated capacitor.

The results of the life test carried out by applying a voltage of 4,000 V are shown in FIG. 4 in terms of the changes of the application time (service life) and the residual percentage.

It can be seen from the results in FIG. 4 that the conventional oil-impregnated capacitors were all broken down within 100 hours, while the oil-impregnated capacitor (D) showed such a very high residual percentage as 100% even after 1,000 hours.

Exactly the same results as described above were obtained also when the tricresyl phosphate was replaced by trixylenyl phosphate. Further, the same results as described above were obtained also when the alkyldiphenylethane was replaced by an alkyldiphenyl or an alkylnaphthalene which are other aromatic hydrocarbons, or by alkyl diphenyl ether which is an ether oil.

In this case, oil-impregnated capacitors containing an epoxide scavenger material were also subjected to the same test as described above, but like (E), all of them were broken down within 100 hours when no organosilane compound was incorporated.

In other words, incorporation of organic phosphate liquids typified by tricresyl phosphate is often conducted for increasing the dielectric constant between electrodes to make a rational design or for rendering a liquid impregnant flame-retardant, but has been disadvantageous in that in general, it enlarges the dissipation factor of an oil-impregnated capacitor and in particular, lowers high-temperature voltage resistance.

This invention is shown to have great effects and provide a heretofore unobtainable highly voltage-resistant capacitor even when an impregnant containing a phosphate liquid is infiltrated.

Although various capacitor structures are described above in Examples, exactly the same effects as described above were obtained also in the case of other structures, for example, oil-impregnated capacitors produced by using a metallized film.

In Examples, a description is given for the organosilane compounds which are particularly preferable in that they have already been industrialized and easily available and practical as organometallic compounds having both a hydrolyzable group and organic functional group, but exactly the same effects as their were brought about by other organometallic compounds having both a hydrolyzable group and an organic functional group such as organotitanate compounds, organotin compounds and the like.

Therefore, conventionally insufficient points of oil-impregnated capacitors produced by using a liquid impregnant containing a scavenger material represented by epoxide compounds, namely, defects such as enlargement of the dissipation factor under a high stress condition, concomitant electrical and thermal breakdown, and resultant great difficulty in making a higher stress design, have been overcome by the oil-impregnated capacitor of the present invention produced by using a liquid impregnant containing at least one organometallic compound, represented by organosilane compounds, having both a hydrolyzable group and an organic functional group. That is to say, high stability of the dissipation factor under higher stress conditions and high voltage-resistance have been attained.

The present invention is not limited to the above Examples but includes conceivable various modifications thereof so long as they do not depart from the gist and scope of the present invention.

What is claimed is:

1. An oil-impregnated capacitor comprising,
    (a) a capacitor element comprising at least one member selected from the group consisting of paper and plastic films,
    (b) said capacitor element impregnated with a liquid impregnated containing at least one organometallic compound having both a hydrolyzable group and an organic functional group.

2. The oil-impregnated capacitor according to claim 1, wherein said organometallic compound is selected from the group consisting of organosilane compounds and organotitanate compounds.

3. The oil-impregnated capacitor according to claim 1, wherein said liquid impregnant is a non-halogenated fluid containing at least one organometallic compound.

4. The oil-impregnated capacitor according to claim 3, wherein said non-halogenated fluid is an oil comprising at least one member selected from the group consisting of organic acid oils, hydrocarbon oils, vegetable oils and ether oils.

5. The oil-impregnated capacitor according to claim 4, wherein the organic acid ester oil is at least one member selected from the group consisting of phthalic acid esters, fatty acid esters, maleic acid esters, fumaric acid esters and organic phosphates.

6. The oil-impregnated capacitor according to claim 4, wherein said hydrogen oil is at least one member selected from the group consisting of arylalkanes, polybutene, liquid paraffin and mineral oils.

7. The oil-impregnated capacitor according to claim 6, wherein said arylalkane is at least one member selected from the group consisting of alkylbenzenes, alkylnaphthalenes, and alkyldiphenylethanes.

8. The oil-impregnated capacitor according to claim 4, wherein said vegetable oils is castor oil and/or sesame oil.

9. The oil-impregnated capacitor according to claim 4, wherein said ether oils are alkyl diphenyl ethers.

10. The oil-impregnated capacitor according to claim 1, wherein said liquid impregnant is prepared by adding the organosilane compound to di(2-ethylhexyl)phthalate containing an epoxide scavenger material.

11. The oil-impregnated capacitor according to claim 10, wherein said organosilane compound is selected from the group consisting of γ-methacryloxypropyltrimethoxysilane, γ-glycidoxypropyltrimethoxysilane, vinyltriethoxysilane, γ-chloropropyltrimethoxysilane, vinyltriethoxysilane, γ-chloropropyltrimethoxysilane, γ-mercaptopropyltrimethoxysilane and vinyltris(β-methoxyethoxy)silane.

12. The oil-impregnated capacitor according to claim 1, wherein said liquid impregnant is prepared by adding the organosilane compound to an alkylbenzene.

13. The oil-impregnated capacitor according to claim 12, wherein γ-methacryloxypropyltrimethoxysilane is used as said organosilane compound and is incorporated in an amount of 0.02 to 10 parts by weight per 100 parts by weight of the liquid impregnant.

14. The oil-impregnated capacitor according to claim 1, wherein said liquid impregnant is prepared by adding γ-glycidoxypropyltrimethoxysilane to di(2-ethylhexyl)phthalate containing an epoxide scavenger material.

15. The oil-impregnated capacitor according to claim 1, wherein said liquid impregnant is prepared by adding the organosilane compound to a mixture of an organic phosphate and at least one member selected from the group consisting of hydrocarbon oils, vegetable oils and ether oils.

16. The oil-impregnated capacitor according to claim 15, wherein said organosilane compound is γ-methacryloxypropyltrimethoxysilane.

17. An oil-impregnated capacitor comprising,
(a) a capacitor element comprising at least one member selected from the group consisting of paper and plastic films,
(b) said capacitor element impregnated with a liquid impregnant containing at least one organosilane compound having the general formula:

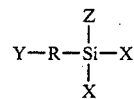

wherein X is a hydrolyzable group linked to the Si atom; Z is an alkyl group, an alkoxy group or an acyloxy group (in particular, an acetoxy group); and Y is one of organic functional groups linked to the Si atom directly or through the alkylene group of R.

18. The oil-impregnated capacitor according to claim 17, wherein said hydrolyzable group X is an alkoxy group or an acyloxy group; and said organic functional group Y is a vinyl group, an epoxy group, a mercapto group, a methacrylo group, a chlorine atom or a peroxide group.

19. The oil-impregnated capacitor according to claim 17, wherein said organosilane compound is at least one member selected from the group consisting of vinyltrimethoxysilane, vinyltriethoxysilane, vinyltris(β-methoxyethoxy)silane, γ-methacryloxypropyltrimethoxysilane, γ-methacryloxypropylmethyldimethoxysilane, γ-glycidoxypropyltrimethoxysilane, γ-glycidoxypropylmethyldimethoxysilane, γ-chloropropyltrimethoxysilane, γ-chloropropylmethyldimethoxysilane, γ-chloropropylmethyldiethoxysilane and γ-mercaptopropyltrimethoxysilane.

20. The oil-impregnated capacitor according to claim 17, wherein said liquid impregnant consists of an alkyl diphenyl ether.

21. The oil-impregnated capacitor according to claim 17, wherein said liquid impregnant consists of an alkylnaphthalene.

22. The oil-impregnated capacitor according to claim 17, wherein said liquid impregnant contains castor oil and/or sesame oil.

23. An oil-impregnated capacitor comprising,
(a) a capacitor element comprising at least one member selected from the group consisting of paper and plastic films,
(b) said capacitor element impregnated with liquid impregnant containing at least one organosilane compound having both a hydrolyzable group and an organic functional group and at least one epoxide compound which does not have a metallic atom within its molecular structure,
(c) said liquid impregnant comprising at least one member selected from the group consisting of hydrocarbon oils, organic acid esters, vegetable oils and ether oils.

24. An oil-impregnated capacitor comprising,
(a) a capacitor element comprising at least one member selected from the group consisting of paper and plastic films, and a pair of electrodes consisting of vapor deposited metal layers,
(b) said capacitor element impregnated with a liquid impregnant containing at least one organosilane compound having both a hydrolyzable group and an organic functional group.

25. The oil-impregnated capacitor according to claim 24, wherein said vapor deposited metal layer is zinc.

26. The oil-impregnated capacitor according to claim 24, wherein said liquid impregnant is an oil comprising at least one member selected from the group consisting of organic acid esters, hydrocarbon oils, vegetable oils and ether oils.

27. The oil-impregnated capacitor according to claim 24, wherein said liquid impregnant consists of an alkyldiphenyl.

28. An oil-impregnated capacitor comprising,
(a) a capacitor element comprising at least one member selected from the group consisting of paper and plastic films, and a pair of electrodes consisting of vapor deposited metal layers,
(b) said capacitor element impregnated with a liquid impregnant comprising at least one member selected from the group consisting of organic acid esters, hydrocarbon oils, vegetable oils and ether oils and containing at least one organosilane compound having the general formula:

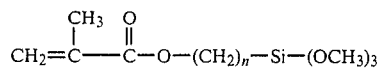

wherein n is 1 to 6, or the general formula:

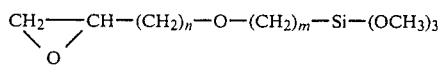

wherein n is 1 to 6 and m is 1 to 6.

29. The oil-impregnated capacitor according to claim 28, wherein said vapor deposited metal layer is zinc.

* * * * *